(12) United States Patent
Seider

(10) Patent No.: US 10,577,046 B2
(45) Date of Patent: Mar. 3, 2020

(54) BICYCLE WITH VARIABLE WHEELBASE

(71) Applicant: Martin Benjamin Seider, Fort Mill, SC (US)

(72) Inventor: Martin Benjamin Seider, Fort Mill, SC (US)

(*) Notice: Subject to any disclaimer, the term of this patent is extended or adjusted under 35 U.S.C. 154(b) by 120 days.

(21) Appl. No.: 15/411,554

(22) Filed: Jan. 20, 2017

(65) Prior Publication Data
US 2017/0233034 A1 Aug. 17, 2017

Related U.S. Application Data

(60) Provisional application No. 62/388,192, filed on Jan. 20, 2016.

(51) Int. Cl.
*B62M 1/20* (2006.01)
*B62M 1/24* (2013.01)
*B62M 1/32* (2013.01)
*B62M 11/12* (2006.01)

(52) U.S. Cl.
CPC .............. *B62M 1/20* (2013.01); *B62M 11/12* (2013.01)

(58) Field of Classification Search
CPC . B62M 1/18; B62M 1/20; B62M 1/24; B62M 1/32; B62M 2700/006; A63G 19/08; A63G 19/14
USPC .... 280/223, 220, 221, 226.1, 227, 254, 258, 280/1.191, 1.194
See application file for complete search history.

(56) References Cited

U.S. PATENT DOCUMENTS

| | | | | |
|---|---|---|---|---|
| 250,316 A * | 11/1881 | Whiting | | |
| 420,922 A * | 2/1890 | Schrader | | |
| 512,538 A * | 1/1894 | Clark et al. | | |
| 580,512 A * | 4/1897 | Sharpneck | | |
| 942,333 A * | 12/1909 | Lennox | | |
| 1,241,607 A * | 10/1917 | Bowen | ............... | A63C 17/12 280/11.115 |
| 1,574,516 A * | 2/1926 | Rohdiek | ............... | B62M 1/32 280/221 |
| 2,423,248 A * | 7/1947 | Middler | ............... | A63G 19/02 280/1.194 |
| 3,998,469 A * | 12/1976 | Ruys | ............... | B62M 1/32 280/254 |
| 5,330,218 A * | 7/1994 | Escudero | ............... | B62M 1/16 280/220 |
| 5,351,979 A * | 10/1994 | Langen | ............... | B62K 21/00 280/254 |

* cited by examiner

Primary Examiner — Anne Marie M Boehler

(57) ABSTRACT

The invention pertains to a bicycle with variable wheelbase which converts the user's body expansion and contraction into propulsion. The invention comprises a frame [1] having a front wheel, and a structure [2] having a rear hub [4]. The structure [2] is suspended pivotally to the frame [1] about a rotational axis [3]. The wheelbase is varied by pivoting the structure [2] about the rotational axis [3]. By pivoting the structure [2], the catching wheels [7] and [8], both connected to the rear hub [4], travel along the retainer [5] and [6], respectively, and transmit torque to the rear hub [4] in one direction.

19 Claims, 4 Drawing Sheets

United States Patent No. US 10,577,046 B2

BICYCLE WITH VARIABLE WHEELBASE

CROSS REFERENCE TO RELATED APPLICATIONS

This application claims priority to U.S. Provisional application Ser. No. 62/388,192 entitled 'Full Body Bicycle' filed on Jan. 20, 2016, which are incorporated herein by reference.

BACKGROUND OF THE INVENTION

In conventional bicycles, alternating force is applied to the pedals which is converted into torque by the crank and which is transmitted by a chain or belt to the rear tire. In this apparatus only certain muscles are involved in the conversion of movement into propulsion.

The problem to increase the amount of muscles being involved in converting movement into propulsion was tackled previously by many other inventions which lack in regards to maneuverability, lightweight design, ease of maintenance and appearance.

Hence there is need for a bicycles which involves more muscle in the conversion of movement into propulsion and which competes with a conventional bicycle in regards to maneuverability, weight, ease of maintenance and appearance.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
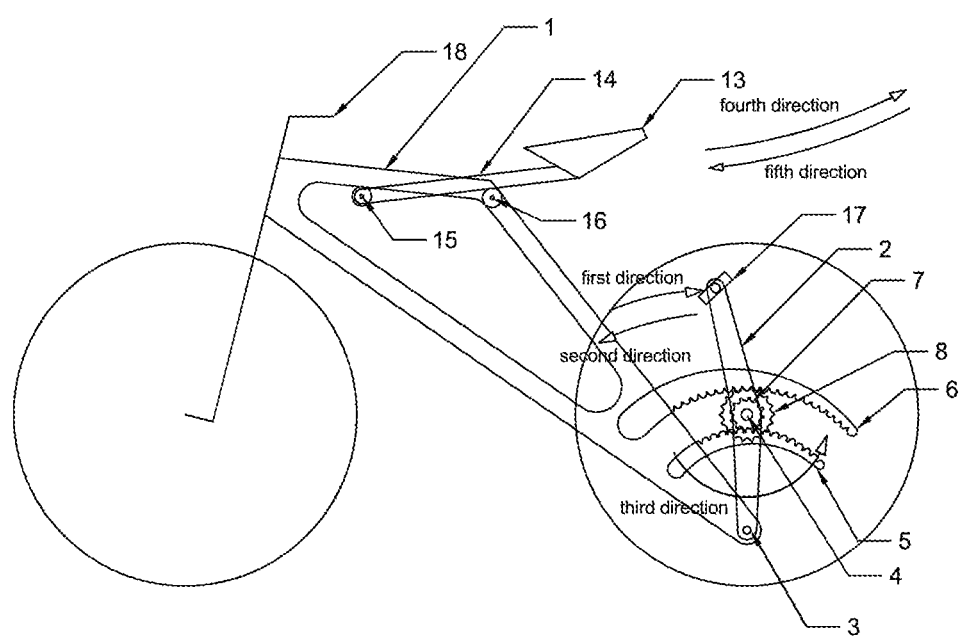
FIG. 1 Bicycle with variable wheelbase and independent gear ratios between expansion and contraction.

The arrangement in FIG. 1 shows an exemplary arrangement of a preferred embodiment. In FIG. 1, one sees a structure [2] connected to a frame [1] in such a way to allow movement around a rotational axis [3]. The rear axle [4] is attached to the structure [2] distant from the rotational axis [3]. The height of the rotational axis [3] over the ground depends on the position of the structure [2]. The equilibrium position is in which the rear axle [4] sits above the rotational axis [3]. There's a force acting on the structure [2] towards the equilibrium position when the structure [2] is moved out of the equilibrium position making the embodiment a swinging system which helps the user to propel the bicycle. An internal gear [6], which is one example for a retainer, and an external gear [5], which is one example for a second retainer, are attached to the frame [1] and a freewheel [8], which is one example for a catching wheel, and a second freewheel [7], which is one example for a second catching wheel, are connected to the rear axle [4]. A pair of pedals [17] is attached to the structure [2] distant from the rotational axis [3]. The seat [13] is attached on one end of a support [14] which is supported by a primary bearing [15] and a secondary bearing [16]. The primary bearing [15] is attached to the other end of the support [14] and is in contact with the frame [1]. The secondary bearing [16] is attached to the frame [1] and is in contact with the support [14] between the seat [13] and the primary bearing [15]. This arrangement allows the linear movement between the frame [1] and the seat [13]. In this embodiment the user sits on the seat [13], holds the handle bar [18] and stands on the pedals [17].

Figure 2:
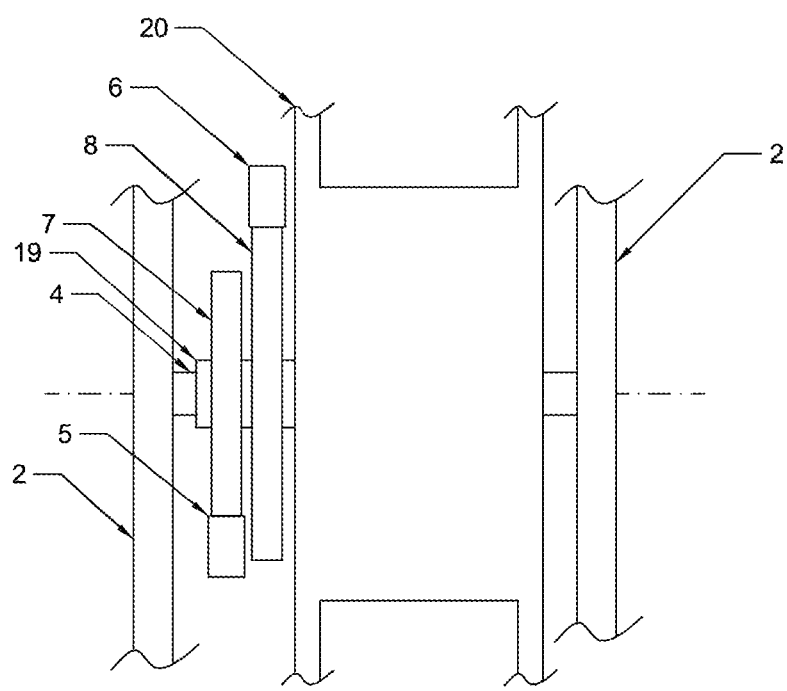
FIG. 2 Rear axle arrangement of the embodiment shown in FIG. 1.

The arrangement in FIG. 2 shows an exemplary arrangement of a rear axle configuration of the embodiment shown in FIG. 1. The rear axle [4] is connected to the structure [2]. The input shaft [19] is connected on the rear axle [4] allowing the input shaft [19] to rotate about the rear axle [4]. The freewheel [8] and the second freewheel [7] are connected to the input shaft [19]. The rear hub [20], which drives the rear tire, is installed on the rear axle [4] allowing the rear hub [20] to rotate about the rear axle [4]. There is a transmission inside the rear hub [20] which connects the input shaft [19] to the rear hub [20] allowing to adjust the gear ratio between the input shaft [19] and the rear hub [20]. When the user expands his body, the structure [2] moves backwards increasing the wheelbase and the seat [13] moves backwards, too. As the structure [2] moves backwards, the gear surface of the freewheel [8] spins on the internal gear [6] in the same sense as the input shaft [19]. As the spinning speed of the gear interface of the freewheel [8] engaging, toothing with the internal gear [6], reaches the spinning speed of the input shaft [19], the one-way clutch in the freewheel [8] engages and torque is transmitted from the freewheel [8] to the rear hub [20]. When the user contracts his body, the structure [2] moves forwards decreasing the wheelbase and the seat [13] moves forwards, too. As the structure [2] moves forwards, the gear interface of the second freewheel [7] spins on the external gear [5] in the same sense as the input shaft [19]. As the spinning speed of the gear interface of the second freewheel [7], toothing with the external gear [5], reaches the spinning speed of the input shaft [19], the one-way clutch in the second freewheel [7] engages and torque is transmitted from the second freewheel [7] to the rear hub [20]. The bicycle is propelled by the user's alternating body expansion and contraction.

Figure 3:
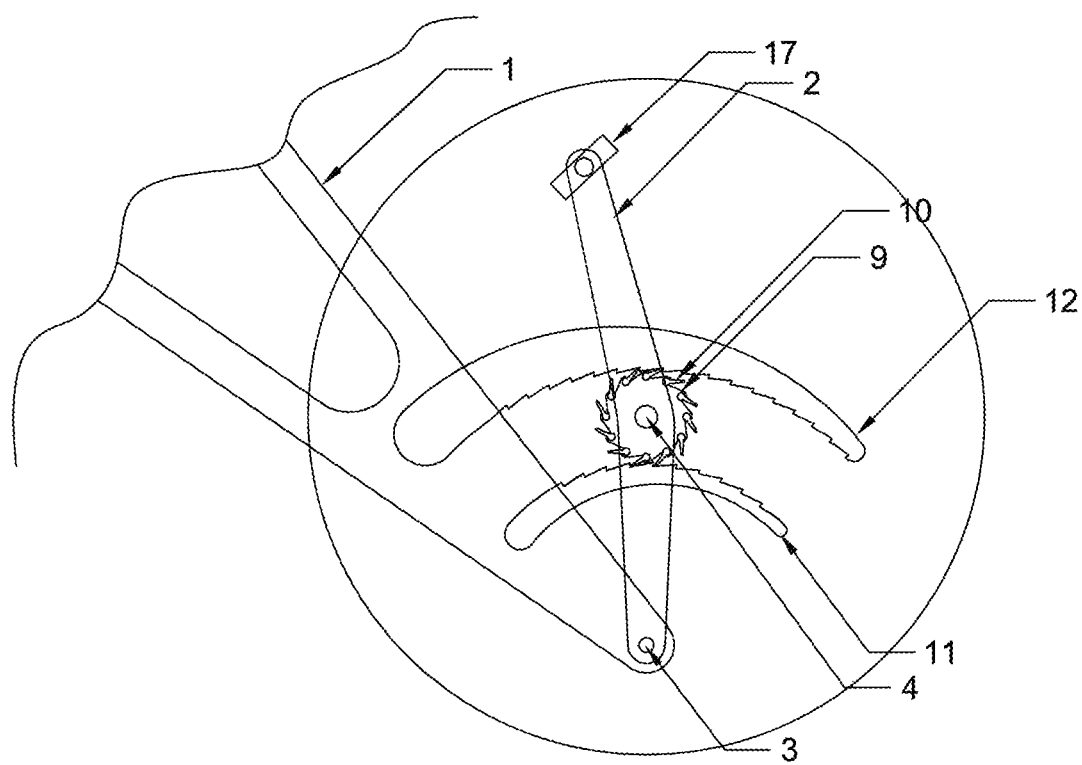
FIG. 3 Bicycle with variable wheelbase and dependent gear ratios between expansion and contraction.

The arrangement in FIG. 3 shows an exemplary arrangement of another preferred embodiment. An internal ratchet [12], which is another example for a retainer, and an external ratchet [11], which is another example for a second retainer, are attached to the frame [1] and an inner race [9], which is another example for a catching wheel, housing a plurality of catching elements [10] is connected to the rear axle [4].

Figure 4:
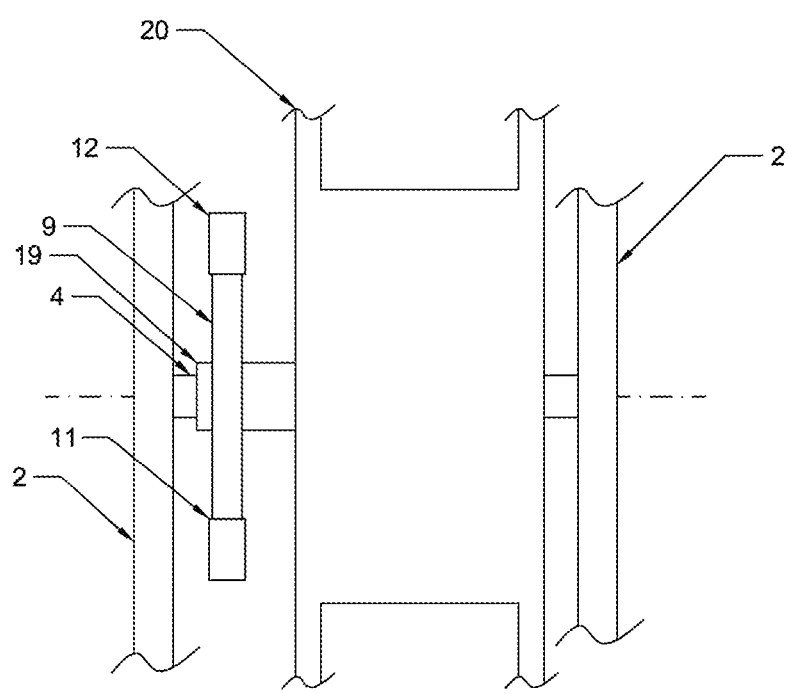
FIG. 4 Rear axle arrangement of the embodiment shown in FIG. 3.

The arrangement in FIG. 4 shows an exemplary arrangement of a rear axle configuration of the embodiment shown in FIG. 3. The rear axle [4] is connected to the structure [2]. The input shaft [19] is connected to the rear axle [4] allowing the input shaft [19] to rotate about the rear axle [4]. The inner race [9] is connected to the input shaft [19]. The rear hub [20] is installed on the rear axle [4] allowing the rear hub [20] to rotate about the rear axle [4]. There is a transmission inside the rear hub [20] which connects the input shaft [19] to the rear hub [20] allowing to adjust the gear ratio between the input shaft [19] and the rear hub [20]. As the structure [2] moves backwards increasing the wheelbase and the angular velocity of the contact point between the catching elements [10] and the internal ratchet [12] about the rear axle [4] reaches the spinning speed of the inner race [9], the catching elements [10] engage with the internal ratchet [12] and torque is transmitted to the rear hub [20]. As the structure [2] moves forwards decreasing the wheelbase and the angular velocity of the contact point between the catching elements [10] and the external ratchet [11] about the rear axle [4] reaches the spinning speed of the inner race [9], the catching elements [10] engage with the external ratchet [11] and torque is transmitted to the rear hub [20].

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A bicycle comprising: a frame [1] having a retainer and a front wheel; a structure [2], connected pivotally to the frame [1] about a rotational axis [3]; varying the distance between front and rear wheel axles, which is defined as the wheelbase, by rotating the structure [2] about the rotational axis [3]; a rear wheel connected to the structure [2] distant from the rotational axis [3]; a catching wheel drivably connected to the rear wheel; the catching wheel travelling along the retainer while increasing the wheelbase; the rear wheel, catching wheel and retainer being configured to transmit torque to the rear wheel only in one direction; a second retainer connected to the frame [1]; a second catching wheel drivably connected to the rear wheel; the second catching wheel travelling along the second retainer while decreasing the wheelbase; the rear wheel, second catching wheel and second retainer being configured to transmit torque to the rear wheel only in one direction; and a pair of pedals [17] connected to the structure [2] distant from the rotational axis [3].

2. The bicycle as defined in claim 1 wherein the catching wheel comprises an inner race [9] and a plurality of catching elements [10].

3. The bicycle as defined in claim 2 wherein the catching elements [10] are spring loaded.

4. The bicycle as defined in claim 1 wherein the second retainer is an external ratchet [11].

5. The bicycle as defined in claim 1 wherein the second catching wheel is a freewheel [7] comprising a one-way clutch and a gear interface.

6. The bicycle as defined in claim 1 wherein the second retainer is an external gear [5].

7. The bicycle as defined in claim 1 further comprising: a transmission being drivably connected with the catching wheel and the rear wheel.

8. The bicycle as defined in claim 1 further comprising: a seat [13] connected to the frame [1] in such a way to allow a linear movement between the frame [1] and the seat [13].

9. The bicycle as defined in claim 8 further comprising: a support [14]; the seat [13] connected to one end of the support [14]; a primary bearing [15] connected to the other end of the support [14]; and a secondary bearing [16] connected to the frame [1]; the primary bearing [15] travelling along the frame [1] and the secondary bearing [16] travelling along the support [14] between the primary bearing [15] and the seat [13] as the support moves relatively to the frame [1].

10. A bicycle comprising: a frame [1] having an internal gear [6] and a front wheel; a structure [2], connected pivotally to the frame [1] about a rotational axis [3]; varying the distance between front and rear wheel axles, which is defined as the wheelbase, by rotating the structure [2] about the rotational axis [3]; a rear wheel connected to the structure [2] distant from the rotational axis [3]; a catching wheel drivably connected to the rear wheel; the catching wheel travelling along the internal gear [6] while increasing the wheelbase; the rear wheel, catching wheel and internal gear [6] being configured to transmit torque to the rear wheel only in one direction; and a pair of pedals [17] connected to the structure [2] distant from the rotational axis [3].

11. The bicycle as defined in claim 10 further comprising: a transmission being drivably connected with the catching wheel and the rear wheel.

12. The bicycle as defined in claim 10 further comprising: a seat [13] connected to the frame [1] in such a way to allow a linear movement between the frame [1] and the seat [13].

13. The bicycle as defined in claim 12 further comprising: a support [14]; the seat [13] connected to one end of the support [14]; a primary bearing [15] connected to the other end of the support [14]; and a secondary bearing [16] connected to the frame [1]; the primary bearing [15] travelling along the frame [1] and the secondary bearing [16] travelling along the support [14] between the primary bearing [15] and the seat [13] as the support moves relatively to the frame [1].

14. A bicycle comprising: a frame [1] having an internal ratchet [12] and a front wheel; a structure [2], connected pivotally to the frame [1] about a rotational axis [3]; varying the distance between front and rear wheel axles, which is defined as the wheelbase, by rotating the structure [2] about the rotational axis [3]; a rear wheel connected to the structure [2] distant from the rotational axis [3]; a catching wheel drivably connected to the rear wheel; the catching wheel travelling along the internal ratchet [12] while increasing the wheelbase; the rear wheel, catching wheel and internal ratchet [12] being configured to transmit torque to the rear wheel only in one direction; and a pair of pedals [17] connected to the structure [2] distant from the rotational axis [3].

15. The bicycle as defined in claim 14 further comprising: a transmission being drivably connected with the catching wheel and the rear wheel.

16. The bicycle as defined in claim 14 further comprising: a seat [13] connected to the frame [1] in such a way to allow a linear movement between the frame [1] and the seat [13].

17. The bicycle as defined in claim 16 further comprising: a support [14]; the seat [13] connected to one end of the support [14]; a primary bearing [15] connected to the other end of the support [14]; and a secondary bearing [16] connected to the frame [1]; the primary bearing [15] travelling along the frame [1] and the secondary bearing [16] travelling along the support [14] between the primary bearing [15] and the seat [13] as the support moves relatively to the frame [1].

18. The bicycle as defined in claim 14 wherein the catching wheel comprises an inner race [9] and a plurality of catching elements [10].

19. The bicycle as defined in claim 18 wherein the catching elements [10] are spring loaded.

* * * * *